Feb. 9, 1926.
W. F. POLSON
1,571,965
AUTOMOBILE HOOD FASTENER
Filed March 9, 1923.
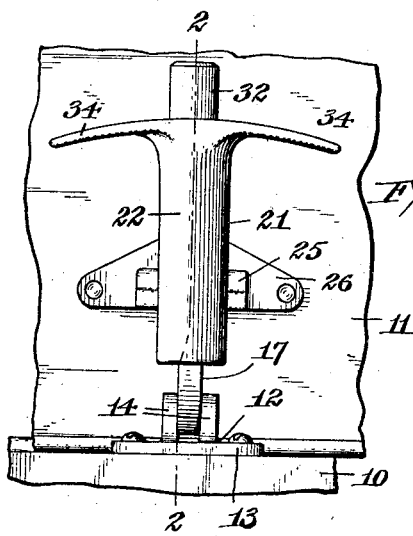
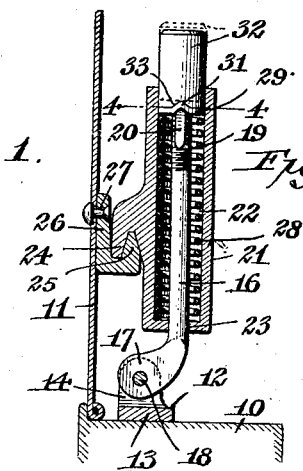
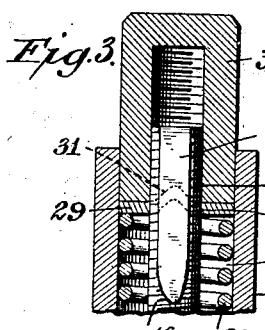
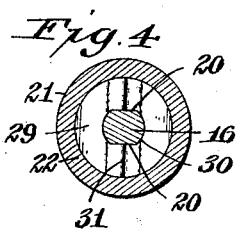
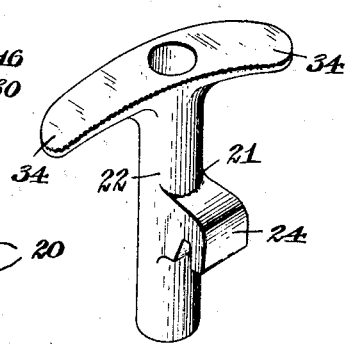
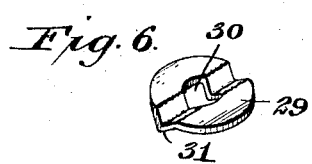
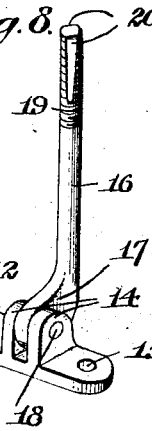
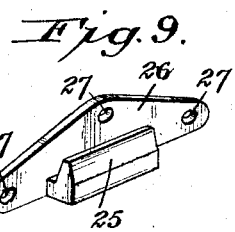
Inventor
William F. Polson,
By Emil Neubach
Attorney
Witness:
J. J. Oberst.

Patented Feb. 9, 1926.

1,571,965

UNITED STATES PATENT OFFICE.

WILLIAM F. POLSON, OF BUFFALO, NEW YORK.

AUTOMOBILE HOOD FASTENER.

Application filed March 9, 1923. Serial No. 623,872.

*To all whom it may concern:*

Be it known that I, WILLIAM F. POLSON, a citizen of the United States, residing at Buffalo, in the county of Erie and State of New York, have invented certain new and useful Improvements in Automobile Hood Fasteners, of which the following is a specification.

My invention relates to improvements in pivoted fasteners, and more particularly to a fastener for automobile hoods.

Fasteners for automobile hoods invariably have spring-retained catch or lock elements and the pressure of the spring employed is intended to be so adjusted prior to attaching the fastener in place, that the hood will be retained in position with its rear end over the cowl of the automobile and its front end seated over a portion of the radiator, the tension or pressure of the spring being adjusted so that undue force will not be required in order to disengage the fastener from the co-acting part on the hood, the adjustment or tension of the spring being also such that rattling of parts of the fastener, or parts intended to be retained thereby, are prevented.

In the ordinary form of automobile hood fastener, the tension or pressure of the spring is adjusted and fixed when assembling the parts of the fastener prior to applying the same to an automobile, a spring being employed and placed under a given tension, figured to properly fasten the hood, yet prevent rattling of parts; but under such condition it is absolutely necessary that the part on the hood co-acting with the fastener shall have a fixed relation to the pivot of the fastener, and if varied slightly, will result either in undue tension or insufficient tension being applied to the spring of the fastener when the fastener is engaged with the hood, with the result that, in the first instance, the hood will be unduly strained and difficulty experienced in gaining access to the interior of the hood, while in the second instance, rattling of the parts will take place. Variations in the framework to which the cowl is applied and the slightest variation in the height of the radiator will result in an improper operative relation of the fastener with the co-acting part or hook on the hood of the automobile, due to the fact that the part applied to the hood, which may in a broad sense be considered a member of the complete fastener, is secured thereto by means of rivets or like fastening devices passed through and fastened into perforations in the hood provided at the time of constructing the hood. Consequently, when applying hood fasteners to automobiles, it is often found necessary to remove the fastener element secured to the trimming or side rails and disassemble the parts with a view of applying more or less tension or pressure to the spring, as may be required.

It is the primary object of my invention to provide a simple and inexpensive hood fastener, which may be secured to the automobile regardless of any variation in the height of the member of the fastener applied to the hood, owing to the fact that tension of the spring and consequently the member of the fastener interlocking with the member on the hood, may be adjusted to assure secure connection between the hood and the frame of the automobile, yet have sufficient tension to prevent rattling of the parts and at the same time make it possible to readily manipulate the fastener when desirous of lifting the hood in order to gain access to the automobile engine.

A further object of my invention is to provide a simple and inexpensive fastener of the kind referred to, in which provision is made for adjusting the tension of the spring without disassembling the parts of the fastener or, if desired, without unhooking the two members of the fastener.

The invention consists in the novel features of construction and in the arrangement and combination of parts to be hereinafter described and more particularly pointed out in the subjoined claims.

In the drawings:—

Fig. 1 is a side elevation of a portion of an automobile showing one of the parts of my improved fastener secured to the hood of the automobile, and the other part thereof to one of the trim members or side rails fastened to the side members of the chassis at opposite sides of the engine space.

Fig. 2 is a vertical section taken on line 2—2, Fig. 1, the adjusting nut and interlocking washer being shown in elevation.

Fig. 3 is an enlarged sectional view of the upper end of one of the members of the fastener showing the adjusting nut and interlocking washer in section.

Fig. 4 is an enlarged section taken on line 4—4, Fig. 2.

Fig. 5 is a detached perspective view of one of the parts of the pivoted member of my improved fastener.

Fig. 6 is an inverted perspective view of the improved interlocking washer.

Fig. 7 is an inverted perspective view of the adjustable nut.

Fig. 8 is a detached perspective view of the pivoted screw bolt and bracket to which it is connected.

Fig. 9 is a detached perspective view of the member of my fastening device riveted or otherwise immovably fastened to the hood of the automobile.

The reference numeral 10 designates one of the trim members or side rails of the automobile secured to the upper faces of the side members of the chassis and lying at opposite sides of the engine, and 11 designates the automobile hood, which extends lengthwise from the cowl to the radiator of the automobile and from one of the trim members or rails of the automobile to the other in archlike formation so as to cover the automobile engine, as will be clearly understood.

The hood 11 is invariably fastened in place by using two fasteners at each side of the automobile, but I have shown only a single fastener in the drawings.

Fastened to a trim member or side rail 10 of the automobile is a bracket 12 having a flat base 13 provided with a pair of spaced upstanding ears 14, the base 13 being screwed or otherwise fastened to the rail, perforations 15 being provided in the base for this purpose.

16 designates a pivoted bolt having a flattened offset portion 17 at its lower end through which and the ears 14 a pivot 18 is passed, said bolt being therefore free to swing in an arc of a circle. The upper or free end of the bolt 16 is threaded, as at 19, and flattened at diametrically opposite points, as at 20, and may therefore be termed a screw-bolt.

21 designates a combined spring casing and hook fastener, and it comprises a cylindrical portion or barrel 22 open at its upper end and having an opening 23 in its bottom through which the pivoted screw bolt 16 is passed, the bolt extending axially through said cylindrical portion or barrel and the latter being slidable on said bolt. Projecting from the barrel 22 between its ends is a hood catch, preferably in the form of a downwardly directed hook 24 adapted to engage a co-acting catch in the form of an upwardly directed hook portion 25 on a fixed member 26 riveted or otherwise fastened to the hood, openings 27 being formed in said fixed member through which and the hood, rivets or other fastening means are passed.

Within the barrel 22 is an expansion spring 28, which bears with its lower end against the bottom of the barrel, and has its upper end bearing against a washer 29 provided with an axial opening 30 having flat sides to fit the upper flattened end of the screw bolt 16; said washer being provided with a V-shaped projection or interlocking portion 31 extending diametrically across the same, said projection or interlocking portion being formed by pressing a V-shaped depression in one side of the washer so as to create a V-shaped projection on the other side thereof. An adjusting nut 32 is threaded onto the upper end of the screw bolt 16, it being comparatively long and cylindrical and fitting into the upper end of the barrel 22. The lower side of this nut is provided with a diametral V-shaped depression 33 adapted to receive the V-shaped projection or interlocking portion 31 of the washer 29, and by reason of said washer being held against rotation on the screw bolt, due to the axial opening therein conforming to the cross sectional formation of the flattened upper end of the screw bolt, the washer is held against rotation but is free to slide on the screw bolt. Therefore, upon rotating the nut 32 to the right on the screw bolt, the washer is depressed against the action of the spring 28, the V-shaped projection of said washer moving out of the V-shaped notch of said nut until the nut is given a half of a complete revolution, when said projection again enters said notch and retains the nut in locked relation to the washer so that the nut cannot turn either to the right or left. Turning of the nut to the right is resorted to when it is found that the spring has not been placed under sufficient tension, but when it is found that the spring has too much tension to permit the convenient manipulation of the fastener, the turning of the nut 32 to the left will permit the spring to expand, as the washer will move upwardly on the bolt a distance proportionate to the degree to which the nut is so rotated; it being understood that when the nut is rotated on the screw bolt in either direction, the projection on the washer is moved out of the notch on the bolt and the under flat face of the nut rides in contact with the ridge of said projection until the notch is again brought in alinement with said projection, at which times the spring will immediately force the washer upwardly, with the projection of the latter entered in the notch of the nut.

It is to be noted that the nut extends outwardly above the upper end of the cylindrical portion or barrel 22 and that while this nut is shown cylindrical throughout its length, it may be otherwise formed so long as the lower end thereof is capable of coacting with the washer 27 in the manner described. The nut 32 and the washer 29 serve as adjusting means to regulate the tension of the spring 28 and, as arranged, this adjusting means is movable independent of the rod and the barrel and may be actuated regardless of the position of other parts of the device. The upper end of the cylindrical portion or barrel 22 is provided with opposite wings or extensions 34 which serve as a handle for said barrel and enables said barrel to be drawn upwardly on the screw bolt against the action of the spring within said barrel, thus disengaging the hook 24 of said barrel from the hook 25 of the fixed member 26 on the hood of the automobile.

It will be apparent from the foregoing that the improper fitting of the hood to the automobile, which is a common occurrence, due to the fact that the framework to which the cowl is secured and also the radiator, may be elevated on one automobile to a greater extent than on another, results in the lower edges of the two parts of the hood being spaced more or less from the trim 10. The packing between the cowl and the rear end of the hood and between the radiator and the front end of the hood of some automobiles vary in thickness or placement from those on other automobiles, resulting in either a loose and noisy connection or a connection whose spring tension or power is so great as to strain the hood or make it impossible to conveniently operate the fasteners; this being especially true since the openings in the hood through which the rivets are passed for fastening the fixed member 26 have a definite and predetermined relation to the lower edges of the hood parts.

Assurance can be had, by the use of this invention, that the tension of the spring can be adjusted to and be maintained at that most desirable for allowing convenient manipulation of the fastener and to prevent undue strain on the parts to which the members of the fastener are connected, and also to prevent rattling of parts, since it is merely necessary to adjust the nut 32 and its washer, after the two members of the fastener are fastened to the desired parts of the automobile.

Having thus described my invention, what I claim is:—

1. In an automobile hood fastener, a barrel having means for engagement with a hood, a screw bolt entering one end of said barrel, a spring within said barrel surrounding said screw bolt and bearing with one end against a fixed part of said barrel, a washer on said screw bolt capable of movement lengthwise thereon but held against rotation, and an adjusting nut threaded onto said screw bolt, said washer bearing against the opposite end of said spring, said washer and adjusting nut having interlocking parts.

2. A fastener for automobile hoods, comprising a barrel having a hood catch adapted to engage the hood of an automobile, a screw bolt extending into said barrel and having a threaded portion flattened at diametrically opposite points, a spring within said barrel bearing with one end against a fixed part of said barrel, a washer on the flattened portion of said bolt against which the other end of said spring bears, and a nut partly entered in said barrel and partly projecting therefrom, said nut bearing against said washer and being rotatable independent of said washer.

3. An automobile hood fastener, comprising two telescopic parts, a spring tending to hold said parts in fully telescoped condition, a washer bearing against said spring, and a nut rotatable on one of said parts and in interlocking relation to said washer, said nut extending partly into said barrel and partly from said barrel.

4. In a device of the kind described, a bracket, a screw bolt having an offset flattened lower portion pivotally secured to said bracket and a threaded upper portion flattened at diametrically opposite points, a barrel having means for engaging the hood of an automobile and being open at its upper end, said barrel having an axial opening in its bottom through which said screw bolt is passed, a washer fitting the flattened portion of said screw bolt within said barrel, a spring compressed between said washer and the bottom of said barrel, and a nut threaded onto said screw bolt and bearing against said washer, said washer being nonrotatable and adapted to be forced downwardly against the action of said spring upon rotation of said nut in one direction, said nut and washer having interlocking parts to prevent accidental rotation of said nut.

5. The combination with a fixed part of an automobile and a movable hood portion, of a fastener having a hook member secured to said hood portion and a pivoted member secured to said fixed automobile part and provided with a hook adapted to engage the hook of said hook member, said pivoted portion embodying in its construction an expansion spring acting to retain said hooks in interlocked condition under desired tension, and accessible means carried by but movable independently of said pivoted portion for adjusting the tension of said spring.

6. An automobile hood fastener having a pivoted part comprising a screw bolt, a barrel through which said screw bolt extends, a spring within said barrel surrounding said screw bolt and bearing with one end against a fixed part of said barrel, a washer held against rotation but slidable on said screw bolt, said washer having a projection on its upper face, and a nut threaded onto said screw bolt and having a notch on its lower face adapted to receive the projection of said washer.

7. In a hood fastener for automobiles, two spring-retained telescopic parts, one of said parts including a barrel, and the other a screw rod extending axially through said barrel, a washer slidable on said screw rod and having a V-shaped projection on its upper side and a nut extending partly into said barrel and having a V-shaped notch to receive the V-shaped projection of said washer.

In testimony whereof I affix my signature.

WILLIAM F. POLSON.